US008886878B1

(12) United States Patent
Neudorf et al.

(10) Patent No.: US 8,886,878 B1
(45) Date of Patent: Nov. 11, 2014

(54) COUNTER MANAGEMENT ALGORITHM SYSTEMS AND METHODS FOR HIGH BANDWIDTH SYSTEMS

(71) Applicants: Kenneth Edward Neudorf, Carp (CA); Richard Robb, Cupertino, CA (US); Kelly Donald Fromm, Newman Lake, WA (US); J. Kevin Seacrist, Spokane Valley, WA (US)

(72) Inventors: Kenneth Edward Neudorf, Carp (CA); Richard Robb, Cupertino, CA (US); Kelly Donald Fromm, Newman Lake, WA (US); J. Kevin Seacrist, Spokane Valley, WA (US)

(73) Assignee: Ciena Corporation, Hanover, MD (US)

( * ) Notice: Subject to any disclaimer, the term of this patent is extended or adjusted under 35 U.S.C. 154(b) by 185 days.

(21) Appl. No.: 13/682,937

(22) Filed: Nov. 21, 2012

(51) Int. Cl.
*G06F 12/00* (2006.01)

(52) U.S. Cl.
CPC ................... *G06F 12/00* (2013.01)
USPC ..................... 711/105; 711/100; 711/104

(58) Field of Classification Search
USPC ........................... 711/105, 100, 104
See application file for complete search history.

(56) References Cited

U.S. PATENT DOCUMENTS

2009/0116611 A1* 5/2009 Gara et al. ............... 377/26

OTHER PUBLICATIONS

Michael Roeder, Bill Lin; "Maintaining Exact Statistics Counters with a Multi-Level Counter Memory"; IEEE Communications Society—U.S. Government work not protected by U.S. copyright—Globecom 2004.
Nan Hua, Bill Lin, Jun (Jim) Xu, Haiquan (Chuck) Zhao; Paper: "Brick: A Novel Exact Active Statistics Counter Architecture"; San Jose, CA, USA; Copyright 2008 AM 978-1-60558034604/08/0011; ANCS '08, Nov. 6-7, 2008.
Rade Stanojevic; "Small active counters"; Paper at the direction of IEEE Communications Society in the IEEE INFOCOM 2007 proceedings. (c)2007 IEEE.
Sriram Ramabhadran, George Varghese; "Efficient Implementation of a Statistics Counter Architecture"; Sigmetrics '03, Jun. 10-14, 2003, San Diego, CA, USA; Copyright 2003 ACM 1-58113-664-1/03/0006.
Devavrat Shah, Sundar Iyer, Balaji Prabhakar, Nick McKeown (Computer Systems Laboratory); "Analysis of a Statistics Counter Architecture"; Research supported by National Science Foundation, under NGI Contract ANI-9872761, the NSF CAREER award, the Alfred P. Sloan Foundation and the Terman Fellowship.

* cited by examiner

*Primary Examiner* — Jasmine Song
(74) *Attorney, Agent, or Firm* — Clements Bernard PLLC; Christopher L. Bernard; Lawrence A. Baratta, Jr.

(57) ABSTRACT

A method, a statistics subsystem, and a system use a combination of commercially available high speed memory and high density low speed memory to mitigate cost, space, control, and power issues associated with storing counters for statistics updates, while meeting the growing width and depth needs of multi-hundred gigabit Carrier Class data network devices. The method, statistics subsystem, and system offer a Counter Management Algorithm (CMA) that relies on rollover bits stored within data of counters. An update to the low speed memory is substantially faster than a rollover time for the counter in the high speed memory thereby allowing statistics to be cached in the high speed memory while updates take place to the low speed memory.

20 Claims, 3 Drawing Sheets

COUNTER MANAGEMENT ALGORITHM SYSTEMS AND METHODS FOR HIGH BANDWIDTH SYSTEMS

FIELD OF THE INVENTION

Generally, the field of art of the present disclosure pertains to digital hardware systems and methods, and more particularly, to counter management algorithm (CMA) systems and methods using low cost memory in multi-hundred gigabit or terabit systems.

BACKGROUND OF THE INVENTION

As data network speeds continue to increase to 200 Gbps, 400 Gbps, and beyond, migrating existing solutions for keeping packet, byte count, and other statistics for a collection of flows become increasingly costly in terms of materials, power, and area to implement. The ability to collect per flow statistics is critical to operating Carrier-Class networks for Service Providers. These statistics can be used for service-level agreement SLA monitoring, billing, historical trending analysis, and used as input into diagnostics/troubleshooting procedures. As our data networks evolve to support larger scale bandwidths (e.g., 10G→100G→400G, etc.), the ability for network elements to provide flow based statistics in a cost effective manner continues to be an important capability.

Large scale, high speed statistics collection is typically performed on hardware device (e.g., line cards, modules, blades, etc.) using expensive, very high speed external memories. Exemplary high speed external memories include Quad Data Rate Static random-access memory (QDRII SRAM), Reduced-latency Dynamic random access memory (RLDRAM), and the like. As speeds of line interfaces increase, counter update speeds increase accordingly, and counter widths must extend beyond 48-bits to prevent rollover. Some chipset vendors are even building a completely new type of very high speed application specific memories that have embedded counting functions in the hopes of providing speed/width/depth scale for future statistics collection architectures. In both cases, the scale of the solution relies on increasing both the frequency and depth of the specialized device. As a direct consequence, the cost of such architectures increases with each technology step required to improve these frequency and depth parameters.

Conventionally, many vendors approach the solution to hardware-based flow statistics counting in a similar way. That is, vendors consider the speed of the fastest moving counter bit, the width of the counter, and the number of flows and translate these into memory speed, memory width and memory depth. A suitable memory technology for all of these parameters is chosen, and the design implemented. However, conventional solutions with very high speed external memories are extremely expensive, require control of a significant number of pins on an integrated circuit, require significant area in the integrated circuit, and utilize extra power.

BRIEF SUMMARY OF THE INVENTION

In an exemplary embodiment, a method includes receiving a frame and generating a flow update request based thereon; processing the flow update request for an individual request for a unique addresses; queuing the individual request in a high speed memory interface; reading count data from a counter associated with the individual requests from high speed memory; monitoring rollover bits for the counter with the individual request added thereto; combining the individual request with the read count data and placing resultant data on a write queue for low speed memory and writing zero to the high speed memory for the counter when one of the rollover bits is set; and combining the individual request with the read count data and writing the resultant data back to the high speed memory when the rollover bits are not set. An update to the low speed memory is substantially faster than a rollover time for the counter in the high speed memory thereby allowing statistics to be cached in the high speed memory while updates take place to the low speed memory. The counter in the high speed memory can include a width of N, N being an integer, and wherein the rollover bits can include a first rollover bit being a second most significant bit, N−1, of the counter and a second rollover bit being a first most significant bit, N, of the counter.

The method can further include determining the first rollover bit is set; writing the resultant data to the high speed memory responsive to the write queue for the low speed memory being full; and determining the second rollover bit is set subsequent to the determining the first rollover bit is set; and placing the resultant data in the write queue in a portion reserved thereby always having space. The rollover bits are maintained as part of the resultant data in the counter in the high speed memory. The method can further include determining whether to move the counter from the high speed memory to the low speed memory in conjunction with a read of the counter associated with a counter update. The low speed memory can include Dynamic random-access memory and the high speed memory can include Static random-access memory. The counter can include both packet count data and byte count data. The method can further include compressing the individual request for the unique addresses.

In another exemplary embodiment, a statistics subsystem includes electrical processing logic configured to: receive a frame and generating a flow update request based thereon; process the flow update request for an individual request for a unique addresses; queue the individual request in a high speed memory interface; read count data from a counter associated with the individual requests from high speed memory; monitor rollover bits for the counter with the individual request added thereto; combine the individual request with the read count data and placing resultant data on a write queue for low speed memory and writing zero to the high speed memory for the counter when one of the rollover bits is set; and combine the individual request with the read count data and writing the resultant data back to the high speed memory when the rollover bits are not set. An update to the low speed memory is substantially faster than a rollover time for the counter in the high speed memory thereby allowing statistics to be cached in the high speed memory while updates take place to the low speed memory. The counter in the high speed memory can include a width of N, N being an integer, and wherein the rollover bits can include a first rollover bit being a second most significant bit, N−1, of the counter and a second rollover bit being a first most significant bit, N, of the counter.

The electrical processing logic can be further configured to: determine the first rollover bit is set; write the resultant data to the high speed memory responsive to the write queue for the low speed memory being full; and determine the second rollover bit is set subsequent to the determining the first rollover bit is set; and place the resultant data in the write queue in a portion reserved thereby always having space. The rollover bits can be maintained as part of the resultant data in the counter in the high speed memory. The electrical processing logic can be further configured to: determine whether to move the counter from the high speed memory to the low speed memory in conjunction with a read of the counter associated with a counter update. The low speed memory can include Dynamic random-access memory and the high speed memory can include Static random-access memory. The counter can include both packet count data and byte count data. The electrical processing logic is further configured to compress the individual request for the unique addresses.

In yet another exemplary embodiment, a system includes a network processor providing Ethernet processing of packets; an offload statistics circuit communicatively coupled to the network processor receiving statistics from the network processor associated with the Ethernet processing of packets; high speed memory communicatively coupled to the offload statistics circuit for caching of counters of the statistics; and low speed memory communicatively coupled to the offload statistics circuit for storing the counters from the high speed memory based on detecting a rollover of rollover bits stored in each of the counters when adding the statistics thereto, wherein the counter in the high speed memory includes a width of N, N being an integer, and wherein the rollover bits include a first rollover bit being a second most significant bit, N−1, of the counter and a second rollover bit being a first most significant bit, N, of the counter. An update to the low speed memory is substantially faster than a rollover time for the counter in the high speed memory thereby allowing statistics to be cached in the high speed memory while updates take place to the low speed memory. The first rollover bit and the second rollover bit can be part of data stored in the counter thereby alleviating a need to maintain a rollover separate from each counter, and wherein a decision to move a counter from the high speed memory to the low speed memory can be part of a read and update cycle of the counter in the high speed memory.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, counter management algorithm (CMA) systems and methods use a combination of commercially available high speed SRAM and high density Dynamic random-access memory (DRAM) to mitigate the aforementioned cost, space, control and, power issues, while meeting the growing width and depth needs of multi-hundred gigabit Carrier Class data network devices.

Figure 1:
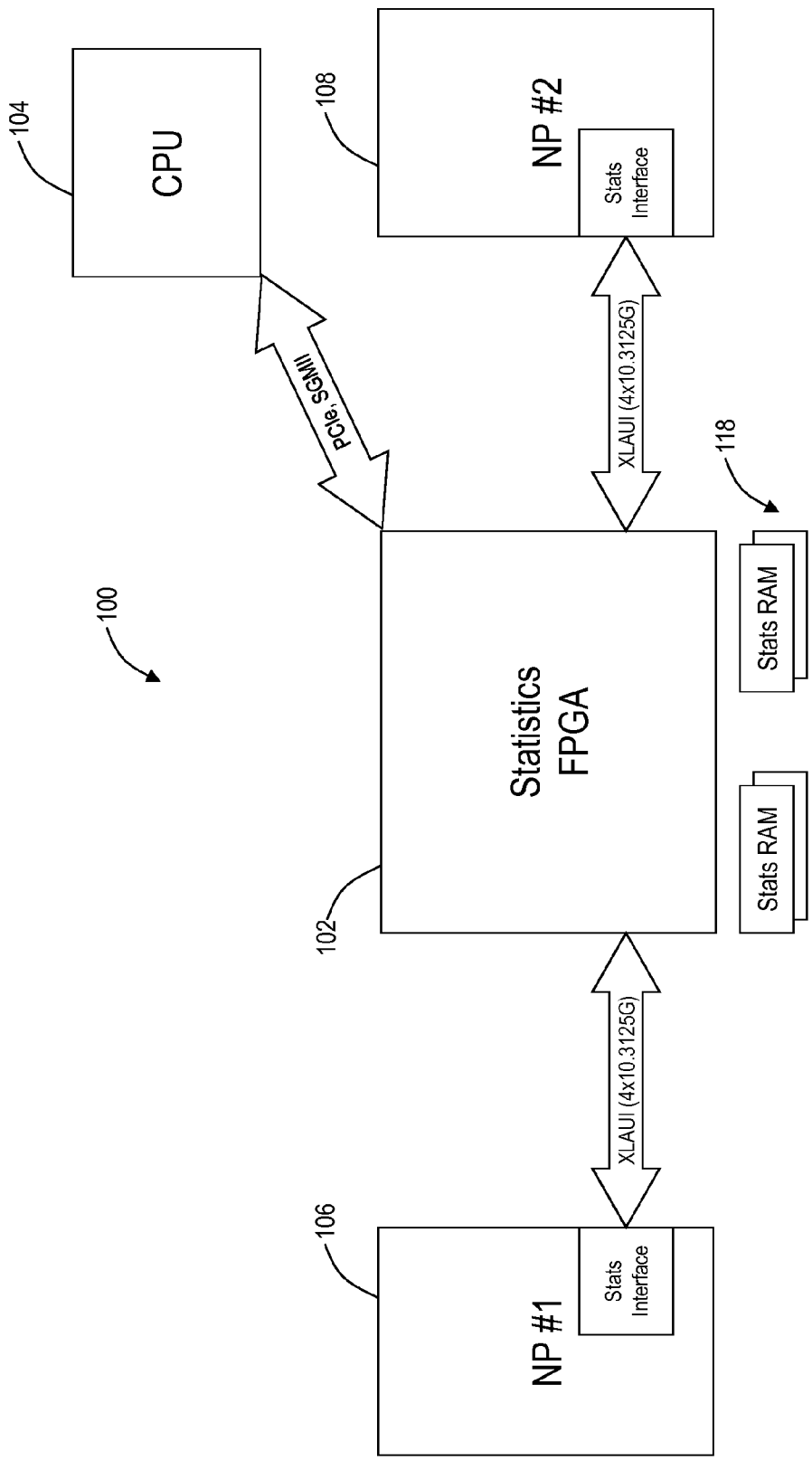
FIG. 1 is a block diagram illustrates an offload subsystem for the counter management algorithm (CMA) systems and methods.

Referring to FIG. 1, in an exemplary embodiment, a block diagram illustrates an offload subsystem 100 for the CMA systems and methods. The offload subsystem 100 is realized using field programmable gate arrays (FPGAs), network processors (NPs), memories including DRAM and SRAM variants, and logic components, firmware, and the like. In this exemplary embodiment, the offload subsystem 100 includes a statistics FPGA 102, a processor 104, and two network processors 106, 108. Those of ordinary skill in the art will recognize the offload subsystem 100 is presented for illustration purposes and can include other components which are omitted for simplicity. The processor 104 is communicatively coupled to the FPGA 102 via a Peripheral Component Interconnect Express (PCIe) interface and/or a Serial Gigabit Media Independent Interface (SGMII), Processor Local Bus (PLB) or similar connection. The statistics FPGA 102 is communicatively coupled to memory 118.

The offload subsystem 100 can be on a line-blade or the like in a data aggregation switch. In an exemplary embodiment, the line-blade can include four 100 Gigabit per second Ethernet port interfaces connected to two packet processing subsystems powered by the network processors 106, 108. Each of the network processors 106, 108 provide up to 40G of processing bandwidth on an XLAUI statistics interface (4×10.3125G). Together these interfaces provide the data source for "offloading" in the offload subsystem 100.

The statistics FPGA receives and processes information on each XLAUI statistics interface from the network processors 106, 108 and stores this information in separate external RAMs in the memory 118. These RAMs as well as internal registers in the statistics FPGA 102 are read/write accessible through its interface to the processor 104.

The statistics FPGA 102 supports a dual XLAUI based statistics interface, one to each of the network processors 106, 108. SERDES speeds can operate at 10.3125G. This unidirectional push-interface contains packets formed by the network processors 106, 108 containing statistics records. These records are generated per packet, and are not accumulated internally by the network processors 106, 108. These packets are processed by the statistics FPGA 102 logic and extracted records transformed into frame and byte count data for a number of flows associated with the network processors 106, 108.

The statistics FPGA 102 maintains a statistics memory used to gather and maintain Flow based counters including accepted and dropped packet and byte counts for flows from the network processors 106, 108. The memory is sized to manage 4M statistics per network processor 106, 108. All statistics counters in the statistics FPGA 102 can be 64-bits wide, providing a minimum 23+ year byte-count rollover when processing 16K-byte line rate traffic at 200 Gbps. As a result, these counters do not include a hardware-based be clear on-read function. The physical memory can include two external 4M×18 QDR2 burst-of-two SRAMs with an operating frequency of 333.33 MHZ, as well as two external 64M× 16 DDR3 DRAMs with an operating frequency of 312.5 MHZ. The QDR2 memory temporarily caches the high speed portion of the counters and the DDR3's maintain the entire counter. The FPGA 102 can incorporate ECC/Parity with the data bits.

Figure 2:
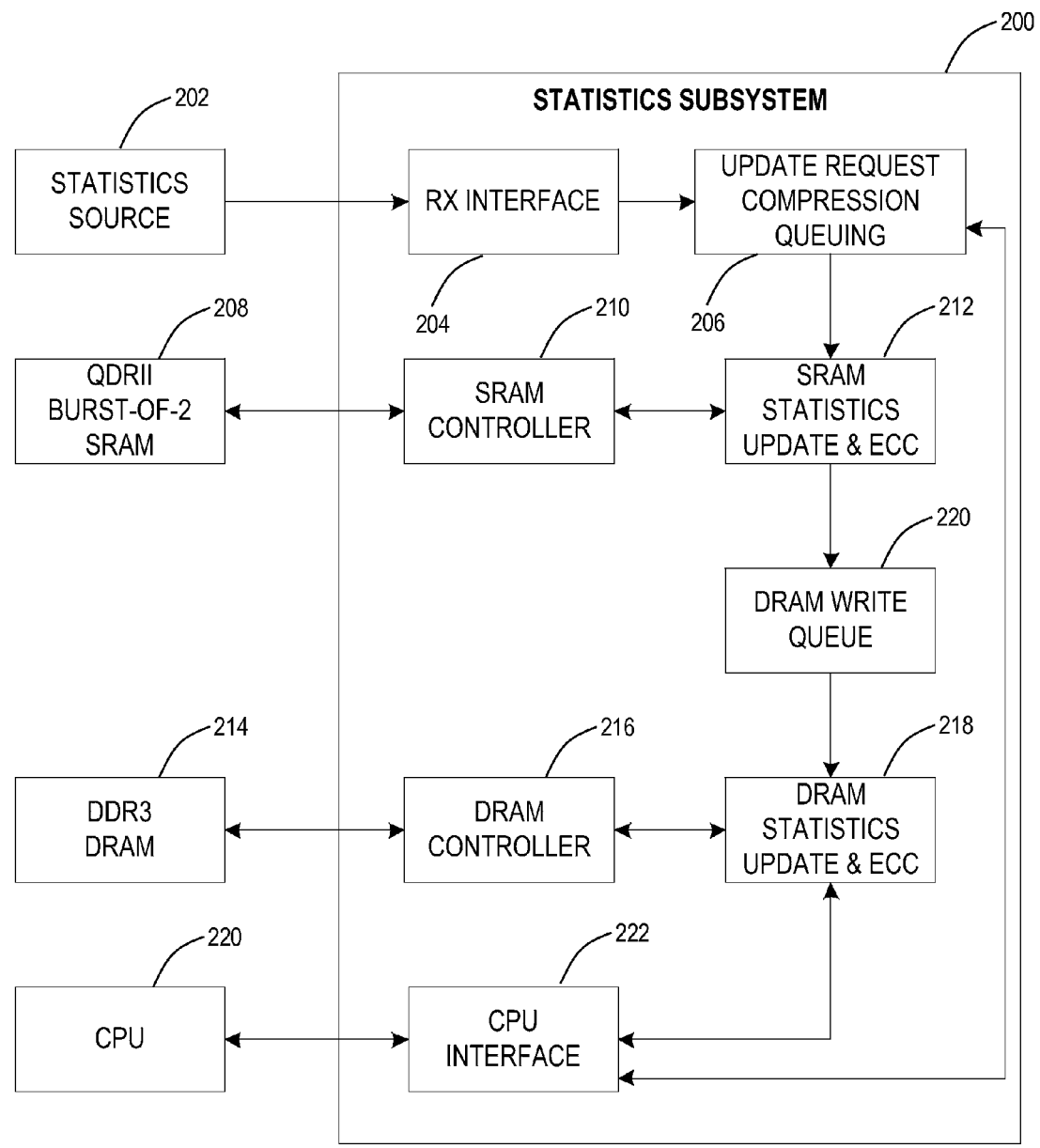
FIG. 2 is a block diagram illustrates a statistics subsystem using the CMA systems and methods.

Referring to FIG. 2, in an exemplary embodiment, a block diagram illustrates a statistics subsystem 200 using the CMA systems and methods. The statistics subsystem 200 can be implemented using the offload system 100 or the like. The statistics subsystem 200 is a functional block diagram of various components providing the CMA systems and methods. For example, the statistics subsystem 200 can be physically realized using FPGAs, network processors (NPs), memories including DRAM and SRAM variants, and logic components, firmware, and the like. As frames arrive in data switching systems, entities within these systems gather information from the frame such as byte count and associate the frame to some type of collection. These collections can include ports, speeds, framing type, Virtual Local Area Networks (VLANs), Internet Protocol (IP) subnets, or any other combination of frame attributes. These collections can be simply referred to as flows. These gathering entities can be referred to as a statistics source 202 which typically forwards this information in some manner to a receive interface 204 in the statistics subsystem 200 where the data is interpreted and counters are maintained for these flows. This functionality is illustrated in an update request, compression, and queuing logical block 206.

These counters can be used by Service Providers to provide a variety of functions such as SLA assurance, billing information, diagnostic data, etc. These gathering entities can be a variety of elements such as ASICs, network processors, FPGAs, or the like. The statistics subsystem 200 can be embedded within these entities or separated into distinct subsystems depending on system requirements. The statistics subsystem 200 may use embedded memories or external memories to maintain their counters. Typical counters for a flow includes both packet and byte counters, and may be referred to as a counter-pair. One frame can be associated with any number of flows.

In general, the CMA systems and methods utilize the statistics subsystem 200 to use external memories to maintain the counters. It relates the speed of the counter to one type of memory, and the width and depth of the counters to a different type of memory. Specifically, the statistics subsystem 200 uses narrow width high speed RAM components 208, 210, 212 to cache the highest speed portion of a flow's counters. This cache, in conjunction with other design techniques, provides the time necessary for subsequently moving this high speed portion of the counters to relatively low speed components 214, 216, 218, 220, but deep RAMs 214 where the entire counter is maintained. The narrow width, high speed RAMs 208 are specifically used because they have cost, power and area advantages over more typically used wider versions. The low speed, deep RAMs 214 are specifically used to provide cheap bulk storage, with minimal power and area impacts. Advantageously, the statistics subsystem 200 is scalable to multi-hundred gigabit systems with multi-millions of flows.

Specifically, the update request, compression, and queuing logical block 206 is coupled to a processor 220 via a processor interface 222 in the statistics subsystem 200. The update request, compression, and queuing logical block 206 is generally responsible for processing of the statistics from the flows received on the receive interface 204 and providing these statistics to am SRAM statistics update and ECC block 212 which can provide the statistics to an SRAM controller 210 for storage in the high speed RAMs 208 and/or provide the statistics from the high speed RAMs 208 to a DRAM statistics and ECC block 218 for storage in the low speed RAMs 214 via a DRAM controller 216. The processor 220 is also coupled to the DRAM statistics and ECC block 218 via the processor interface 222 for control thereof. In general, the statistics subsystem 200 manages high speed statistics flows in the high speed RAMs 208, low speed statistics flows in the low speed RAMs 214, and movement from the high speed RAMs 208 to the low speed RAMs 214.

When considering speed component of the statistics subsystem 200, it is important to the CMA systems and methods to note that only the lowest order bit of the counter can change at the frame arrival rate (the frame rate). Each other bit in the counter changes at ½ the rate of the next lowest order bit. This observation is used to set the minimum width of the cached counter relative to the update rate of the low speed memory. This relationship coupled with frame rate drives the selection of the high speed RAMs 208.

In order to better understand this, consider a 200 Gbps system. The frame rate is determined by the equation system-bit-speed/frame-bits. For an Ethernet system this rate is 672/$200 \times 10^9$ or 3.36 nS. The high speed memory must be capable of updating any counter at this rate. Now consider the high speed memory's 208 counter width and its relationship to the low speed memory update speed. One of the basic premises of the CMA systems and methods is that the high speed memory counter value is added to the counter value held in the low speed memory 214. It is important to note at this point that the low speed memory 214 update rate is the total time needed for a complete read-modify-write cycle, and not just a memory frequency. Regardless, if N-bits are kept in the high speed cached counter, it will rollover at $2^{-N}$*frame-rate. The relationship to note here is the larger the number of bits kept in this counter, the slower the low speed memory 214 update needs to be.

Again, consider the prior 200 Gbps example. If an 11-bit packet counter is kept in the high speed memory 208, it will rollover in $2^{-11}$*672/200e9=6.88 uS. This value bounds how long there is to perform the low speed memory 214 update. For example, if 64 memory cycles are needed to update the low speed memory's 214 counter, the low speed memory would need to run greater than 6.88 uS/64=107.5 ns or 9.3 MHz. This is well within the capabilities of today's bulk memory devices.

Figure 3:
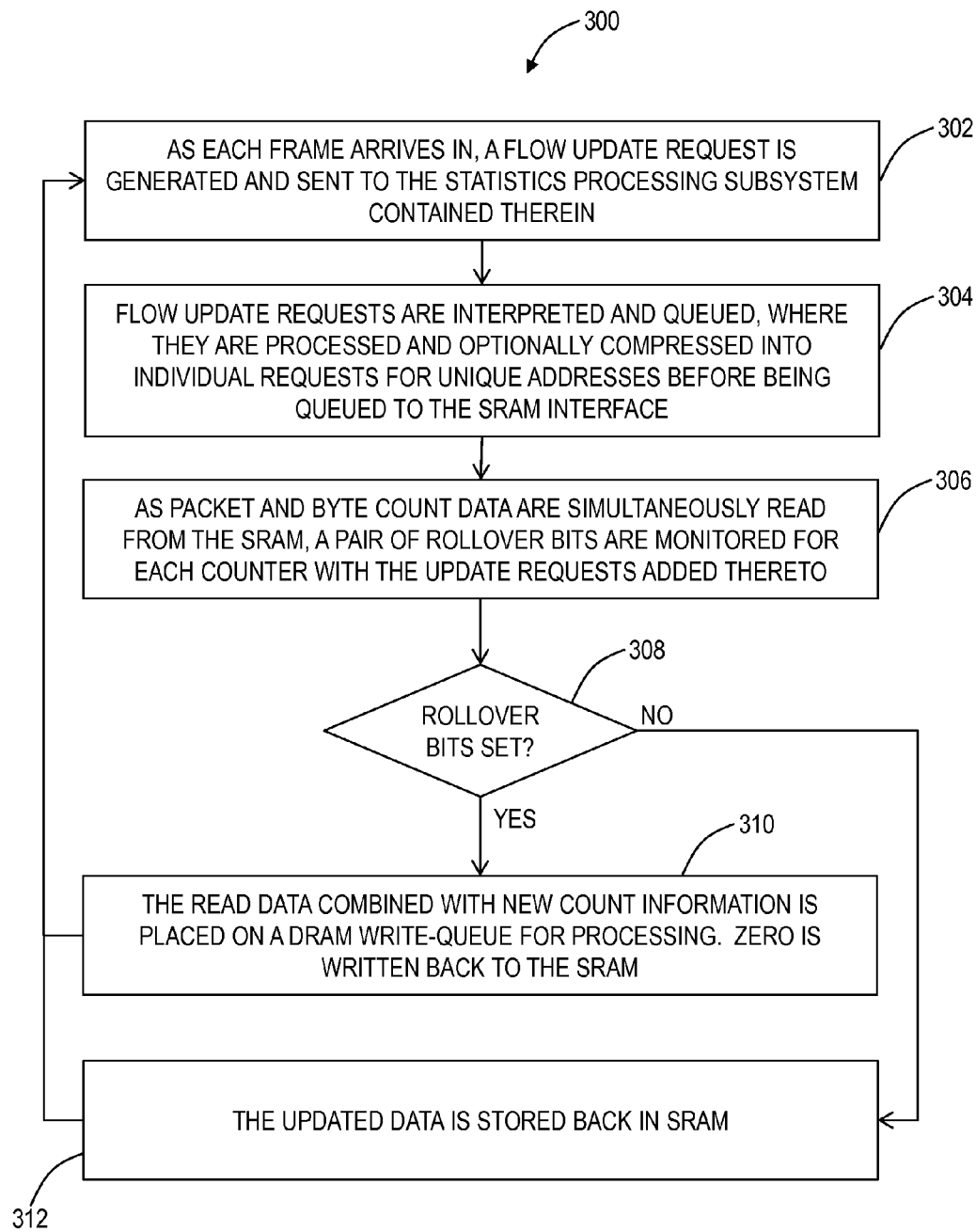
FIG. 3 is a flowchart of an exemplary implementation of a CMA method.

Referring to FIG. 3, in an exemplary embodiment, a flowchart illustrates an exemplary implementation of a CMA method 300 to provide a better view of how the various elements in the statistics subsystem 200 might interact. The foregoing with respect to FIG. 2 illustrates an understanding of the operational speed association between the high speed memory 208 and the low speed memory 214 relative to the CMA systems and methods.

In an exemplary embodiment, the high speed memories 208 can include narrow width, 18-bit QDRII burst-of-two SRAMs to simultaneously cache the highest speed portions of a given flow's packet and byte counter. Placing both counters in a single memory takes advantage of the SRAM's existing burst-of-two architecture, while limiting the amount of SRAM needed. The 18-bit burst-of-two width is partitioned accordingly to maintain counters large enough to provide adequate time for our low speed memory update, including additional error correction bits. The low speed memories 214 in this exemplary embodiment are 16-bit DDR3 DRAMs, configured in a burst-of-sixteen architecture that provides 128 bits for each counter plus additional error correction bits.

As each frame arrives in this statistics subsystem 200 through the receive interface 204, a flow update request is generated by the block 206 and sent to the statistics processing subsystem contained therein (step 302). These flow update requests are interpreted and queued by the statistics subsystem 200, where they are processed and optionally compressed into individual requests for unique addresses before being queued to the SRAM interface via the SRAM controller 210 (step 304). For example, 32 update requests for 4 unique addresses will be merged into 4 unique entries in the SRAM read queue. This compression insures data coherency during the SRAM read-modify-write cycle. If this step is not done, the design becomes much more complex. Without compression, reads of old data may occur before updates have been processed. This will have to be accounted for using stall techniques or re-ordering, etc. At line rate, these update requests will come every 3.36 ns, so there is very little time for this more complex logic. Another way to do this would be to keep track of the last N address and data words written to SRAM in an internal table. If the new SRAM read address matches one of the N Table entries, then just use the Table data instead of the read data from the SRAM to update the counter. No compression is required to do this As packet and byte count data are simultaneously read from the SRAM, a pair of Rollover bits are monitored for each counter with the update requests added thereto (step 306). If either Rollover bit is set (after adding the update requests) (step 308), the read data combined with new count information is placed on a DRAM write-queue for processing (step 310). Zero is written back to the SRAM. If neither Rollover bit is set (after adding the update requests) (step 308), the updated data is stored back in SRAM (step 312). If the DRAM write-queue is currently full for some reason, the updated data is stored back in SRAM.

Under very specific alignments, it may be possible that a specific update event could find the DRAM write-queue full multiple times. If this alignment occurs frequently enough, a secondary Rollover bit is set in the counter. This bit is monitored using a set of null update requests that are generated in the background by the hardware during times when statistics update requests are not present. Sufficient over-speed is designed into the subsystem 200 to allow this. When a secondary Rollover bit is detected by a null update request, the data from the location is placed in a portion of the DRAM write-queue that will always have space, and the entry will be serviced.

Processor (CPU) access to statistics occurs at the DRAM where the entire counter is maintained. When a read request is made to DRAM by the CPU, a CPU update request is injected into the SRAM compression queue during a null update request slot. This causes the entry to be read from SRAM, cleared and placed in the guaranteed space in the DRAM write-queue. The data from the SRAM is subsequently combined with the data from the DRAM and returned to the CPU.

The CMA systems and methods including the offload system 100, the statistics subsystem 200, and the method 300 rely on the following key elements:
(1) The DRAM update must be substantially faster than the SRAM counter rollover time;
(2) The SRAM counter of width N (N being an integer) must use bit N−1 as the first rollover flag and bit N as a second rollover flag;
(3) The rollover of M counters occurs at M times the rollover rate (M being an integer);
(4) The processing of first rollovers uses the update event itself as the processing trigger;
(5) All counter data is nominally maintained in DRAM;
(6) Counters that are not being serviced by the update events and are still counting due to rare but possible alignment conditions can be detected using the second rollover flag from (2) and will be serviced by background processes; and
(7) Sufficient over-speed is designed in the system to handle CPU access and background scrubbing of un-serviced counters that have rolled over past the second rollover flag.

The inequality in (1) allows statistics events to be cached in SRAM while the DRAM update takes place. For example, a DRAM update rate of 600 nS versus an SRAM counter first rollover of 6 uS would easily satisfy this equation (10 to 1). These speeds are readily achieved in the RAM technology described in this embodiment. The first rollover bit in (2) allows a rollover to occur, be flagged and processed by the next statistics event. This is critical to marking counters that need to be serviced next. The observation in (3) allows servicing time to DRAM to slow down by a multiplier of the number of counters being sequentially updated. For example, define a rollover time of R for a single service's counter when running at line rate. When two services interleave at line rate, the time for each to rollover their counters is 2R. Each additional service added extends the time available to service the rollovers. This effectively removes number of services from the servicing equation.

The requirement of (4) allows counters that are being updated to get immediate service, and lets counters that are idle to remain un-serviced. By definition idle counters cannot overflow, and are collected only when a CPU access to the counters is requested. The requirement of (5) allows the depth and width of the counters to scale at DRAM sizes, as long as (1) is maintained. The establishment of a background scrubbing process using null records in conjunction with the second rollover bit in (2) and the over-speed described in (7) allows (6) to be managed without issue.

Typical HW based flow statistics counting solutions look at the speed of the fastest moving bit, the width of the counter, and the number of flows and translate these into memory speed, memory width and memory depth. These are then applied to a single technology. By contrast, the CMA systems and methods apply high speed memory technology only to the parts of the counters that truly need it. This drastically limits the amount of high speed memory needed, including its associated cost, area, and power. Using the CMA systems and methods, even the very high speed, wide, and deep counters required by 200G, 400G+architectures can be maintained in bulk memory technology where the per-bit cost, area, and power is the lowest available. The CMA systems and methods:
(1) use the minimum amount of narrow, high speed memory necessary to address the statistics counter speed requirements of the associated network;
(2) use wide, low speed memory to address the statistics counter width and depth requirements of the associated network;
(3) balance the width of the counter cached in high speed memory against the update rate of the low speed memory such that the rollover rate of the counter cached in the high speed memory is much slower than the update rate of the low speed memory;
(4) transfer the cached counter information in the high speed memory to the low speed memory;
(5) use frame arrival interval as the mechanism to service the high speed memory for both updates and transfers;
(6) monitor a bit in the high speed memory to detect pending rollover during (5)
(7) monitor an additional bit in the high speed memory to detect non-service conditions;
(8) organize bits in the high speed memory such that the rollover bit of (6) and the non-service bit of (7) are MSB and MSB-1 of the counter bits held in high speed memory;
(9) use a small over-speed factor on the high speed memory to provide additional processing bandwidth;
(10) instrument a background scrubbing mechanism that uses (9) to service cached counters with condition (7);
(11) use a queue between the high speed memory and the low speed memory to hold transfer transactions;
(12) reserve guaranteed space in (11) to insure space for processing counters detected by (10); and
(13) use ingress write queue compression techniques to insure coherency in the high speed memory during updates.

Of note, the CMA systems and methods presented herein solve several necessary elements of a practical implementation that has not been discussed in conventional solutions. In addition to using a far better way to determine which SRAM counter to move to DRAM, the CMA systems and methods include a solution to the SRAM cache coherency problem inherent in very high speed applications, and solves what could be rather complex CPU access requirements using this same SRAM cache coherency mechanism. For example, in a basic comparison to the other conventional CMA approaches that pertains to a DRAM+SRAM architecture, conventional solutions focus discussion on the mathematical optimizations of SRAM bit usage and discuss a CMA solution called Largest Counter First or LCF. The LCF approach describes a theoretical CMA that is capable of understanding which statistic has the largest counter, and always sends that counter to SRAM next. Unfortunately, this algorithm is impractical to implement. A Largest Recent with threshold T or LR(T) attempts to solve the LCF problem, but is inherently complex.

LR(T) uses additional SRAM structures to hold an "aggregated bitmap" for threshold crossings, and separate logic to process updates from SRAM to DRAM. This requires a CMA controller that is monitoring these "bitmaps" and accessing the main SRAM to reset the counters based on what it has found. This causes an impractical speed element in the design because the monitor must scan all of the "bitmaps" in the time it takes to perform a DRAM update. Imagine needing to make a single selection from 4 million possible counters in a few hundred nanoseconds. By comparison, the approach described herein maintains thresholds as part of the counter data in one SRAM. The approach described herein uses the frame arrival time as the main CMA control entity, and not a separately timed logical component. This critical difference allows the normal SRAM update logic to perform not just the update, but the next-counter selection and the associated counter reset in one SRAM read modify write access cycle. This requires ½ the number of SRAM accesses as LR(T), and translates into additional bandwidth to be applied to faster update rates. The frame driven CMA control approach described herein has no impractical speed element associated with the counter selection process. It inherently scales without regard to the number of counters being kept.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method, comprising:
   receiving a frame and generating a flow update request based thereon;
   processing the flow update request for an individual request for a unique addresses;
   queuing the individual request in a high speed memory interface;
   reading count data from a counter associated with the individual requests from high speed memory;
   monitoring rollover bits for the counter with the individual request added thereto;
   combining the individual request with the read count data and placing resultant data on a write queue for low speed memory and writing zero to the high speed memory for the counter when one of the rollover bits is set; and
   combining the individual request with the read count data and writing the resultant data back to the high speed memory when the rollover bits are not set.

2. The method of claim 1, wherein an update to the low speed memory is substantially faster than a rollover time for the counter in the high speed memory thereby allowing statistics to be cached in the high speed memory while updates take place to the low speed memory.

3. The method of claim 1, wherein the counter in the high speed memory comprises a width of N, N being an integer, and wherein the rollover bits comprise a first rollover bit being a second most significant bit, N−1, of the counter and a second rollover bit being a first most significant bit, N, of the counter.

4. The method of claim 3, further comprising:
   determining the first rollover bit is set;
   writing the resultant data to the high speed memory responsive to the write queue for the low speed memory being full;
   determining the second rollover bit is set subsequent to the determining the first rollover bit is set; and
   placing the resultant data in the write queue in a portion reserved thereby always having space.

5. The method of claim 1, wherein the rollover bits are maintained as part of the resultant data in the counter in the high speed memory.

6. The method of claim 1, further comprising:
   determining whether to move the counter from the high speed memory to the low speed memory in conjunction with a read of the counter associated with a counter update.

7. The method of claim 1, wherein the low speed memory comprises Dynamic random-access memory and the high speed memory comprises Static random-access memory.

8. The method of claim 1, wherein the counter comprises both packet count data and byte count data.

9. The method of claim 1, further comprising:
   compressing the individual request for the unique addresses.

10. A statistics subsystem, comprising:
electrical processing logic configured to:
- receive a frame and generating a flow update request based thereon;
- process the flow update request for an individual request for a unique addresses;
- queue the individual request in a high speed memory interface;
- read count data from a counter associated with the individual requests from high speed memory;
- monitor rollover bits for the counter with the individual request added thereto;
- combine the individual request with the read count data and placing resultant data on a write queue for low speed memory and writing zero to the high speed memory for the counter when one of the rollover bits is set; and
- combine the individual request with the read count data and writing the resultant data back to the high speed memory when the rollover bits are not set.

11. The statistics subsystem of claim 10, wherein an update to the low speed memory is substantially faster than a rollover time for the counter in the high speed memory thereby allowing statistics to be cached in the high speed memory while updates take place to the low speed memory.

12. The statistics subsystem of claim 10, wherein the counter in the high speed memory comprises a width of N, N being an integer, and wherein the rollover bits comprise a first rollover bit being a second most significant bit, N−1, of the counter and a second rollover bit being a first most significant bit, N, of the counter.

13. The statistics subsystem of claim 12, wherein the electrical processing logic is further configured to:
- determine the first rollover bit is set;
- write the resultant data to the high speed memory responsive to the write queue for the low speed memory being full; and
- determine the second rollover bit is set subsequent to the determining the first rollover bit is set; and
- place the resultant data in the write queue in a portion reserved thereby always having space.

14. The statistics subsystem of claim 10, wherein the rollover bits are maintained as part of the resultant data in the counter in the high speed memory.

15. The statistics subsystem of claim 10, wherein the electrical processing logic is further configured to:
- determine whether to move the counter from the high speed memory to the low speed memory in conjunction with a read of the counter associated with a counter update.

16. The statistics subsystem of claim 10, wherein the low speed memory comprises Dynamic random-access memory and the high speed memory comprises Static random-access memory.

17. The statistics subsystem of claim 10, wherein the counter comprises both packet count data and byte count data.

18. The statistics subsystem of claim 10, wherein the electrical processing logic is further configured to:
- compress the individual request for the unique addresses.

19. A system, comprising:
- a network processor providing Ethernet processing of packets;
- an offload statistics circuit communicatively coupled to the network processor receiving statistics from the network processor associated with the Ethernet processing of packets;
- high speed memory communicatively coupled to the offload statistics circuit for caching of counters of the statistics; and
- low speed memory communicatively coupled to the offload statistics circuit for storing the counters from the high speed memory based on detecting a rollover of rollover bits stored in each of the counters when adding the statistics thereto, wherein the counter in the high speed memory comprises a width of N, N being an integer, and wherein the rollover bits comprise a first rollover bit being a second most significant bit, N−1, of the counter and a second rollover bit being a first most significant bit, N, of the counter.

20. The system of claim 19, wherein an update to the low speed memory is substantially faster than a rollover time for the counter in the high speed memory thereby allowing statistics to be cached in the high speed memory while updates take place to the low speed memory; and
- wherein the first rollover bit and the second rollover bit are part of data stored in the counter thereby alleviating a need to maintain a rollover separate from each counter, and wherein a decision to move a counter from the high speed memory to the low speed memory is part of a read and update cycle of the counter in the high speed memory.

* * * * *